No. 846,136. PATENTED MAR. 5, 1907.
R. D. PARDEE.
CREDIT ACCOUNTING APPLIANCE.
APPLICATION FILED MAR. 31, 1906.
2 SHEETS—SHEET 1.
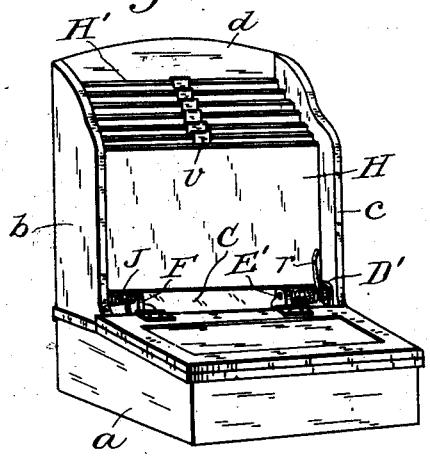
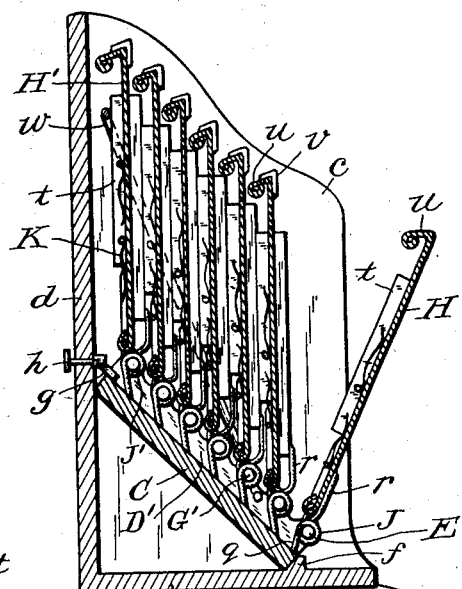
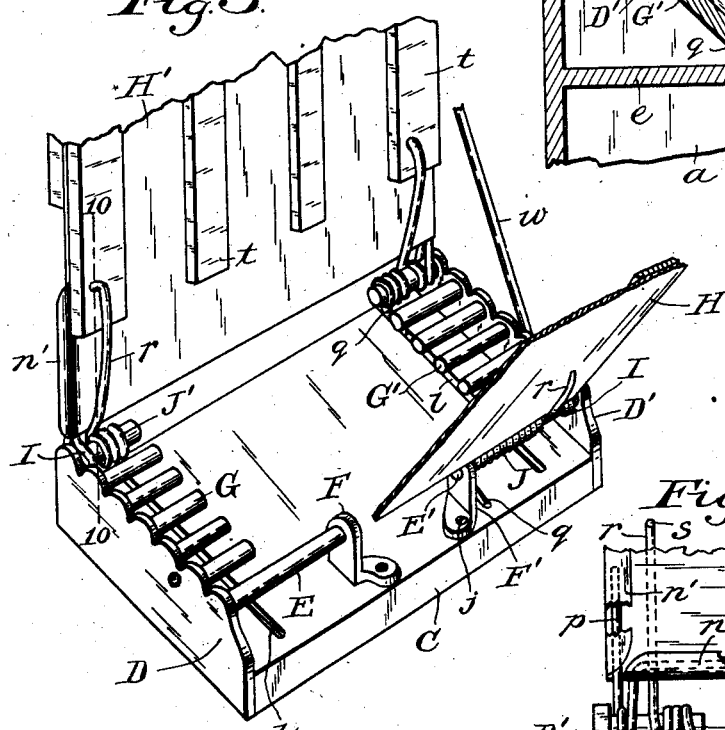
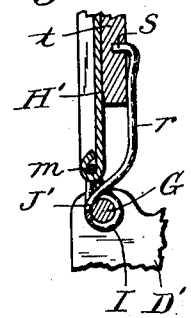
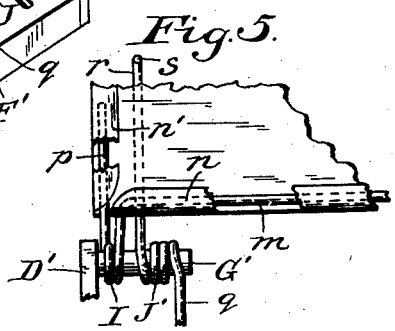
Witnesses:
Dow W. Voorhies.
Stella Snider.
Inventor:
Rollin D. Pardee,
By E. T. Silvius,
Attorney.

No. 846,136. PATENTED MAR. 5, 1907.
R. D. PARDEE.
CREDIT ACCOUNTING APPLIANCE.
APPLICATION FILED MAR. 31, 1906.
2 SHEETS—SHEET 2.
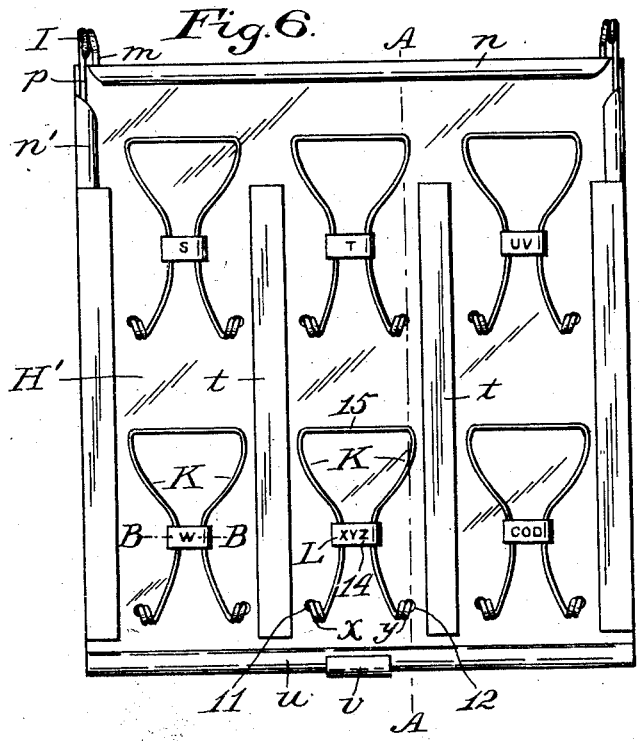
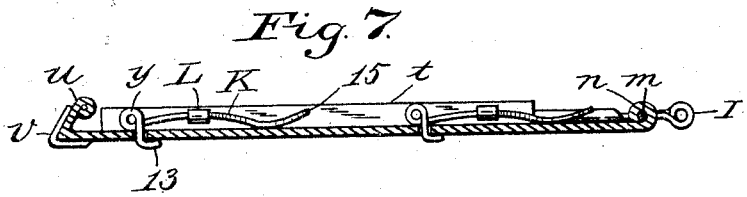
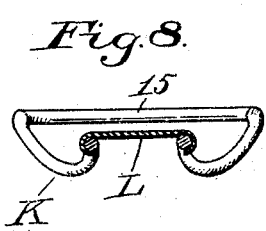
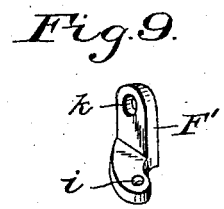
WITNESSES:
Dow W. Voorhies.
Stella Snider.
INVENTOR:
Rollin D. Pardee,
BY E. T. Silvius,
ATTORNEY.

UNITED STATES PATENT OFFICE.

ROLLIN D. PARDEE, OF GARRETTSVILLE, OHIO, ASSIGNOR TO THE McCASKEY REGISTER COMPANY, OF ALLIANCE, OHIO, A CORPORATION OF OHIO.

CREDIT-ACCOUNTING APPLIANCE.

No. 846,136.   Specification of Letters Patent.   Patented March 5, 1907.

Application filed March 31, 1906. Serial No. 309,029.

*To all whom it may concern:*

Be it known that I, ROLLIN D. PARDEE, a citizen of the United States, residing at Garrettsville, in the county of Portage and State of Ohio, have invented new and useful Improvements in Credit-Accounting Appliances; and I do declare the following to be a full, clear, and exact description of the invention, reference being had to the accompanying drawings, and to the letters and figures of reference marked thereon, which form a part of this specification.

This invention relates to cabinets and apparatus thereof pertaining to credit-account systems in which duplicates of original itemized invoices or sales-slips are filed in systematic order without making book-entries of the accounts, the invention having particular reference to the leaves and clips thereon for holding the slips or bills and also referring to the frames and mountings of the leaves.

Objects of the invention are to provide bill-holding leaves of improved construction, to provide improved hinges for the leaves, to provide improved springs for holding the leaves upright, to provide means for enabling the unskilled to replace broken or weak springs with new ones, and to provide improved spring-clips for the leaves.

With the above-mentioned and minor objects in view the invention consists of improved and simplified frames for supporting and connecting the leaves together, removable springs for the leaves detachably connected thereto, so as to prevent the springs from chafing the faces of the leaves, novel forms of hinge members for the leaves, and in improved bill-clips; and, further, the invention consists in the novel parts of the apparatus and in the combinations and arrangements of parts, as hereinafter particularly described, and referred to in the claims.

Referring to the drawings, Figure 1 represents perspectively a credit-account cabinet having the improvements connected therewith; Fig. 2, a fragmentary central transverse sectional view showing the apparatus in the cabinet, one of the leaves being assumed to be held away from the others; Fig. 3, a perspective view of the frame of the leaves with fragments of leaves mounted thereon; Fig. 4, a fragmentary sectional view approximately on the line 10 10 in Fig. 3; Fig. 5, a fragmentary rear detail view showing a hinge and spring of a leaf; Fig. 6, a plan view of one of the leaves, showing the rear thereof as normally held or the top when the leaf is horizontal; Fig. 7, a sectional view of the leaf on the line A A in Fig. 6; Fig. 8, a transverse sectional view of a bill-holding clip as on the line B B in Fig. 6, and Fig. 9 a perspective view of a standard for supporting the end of a hinge-stud.

Similar reference characters in the drawings designate corresponding elements or features.

As illustrating the purposes and the manner of using the improvements, a well-known type of cabinet is shown, comprising a desk part $a$ and an upright case mounted on the rear part of the desk comprising sides $b$ and $c$, a back $d$, and a bottom $e$, there being a ledge $f$ on the forward portion of the bottom $e$. The cabinet may be suitably modified for holding and inclosing the bill-holding leaves.

The frame for the bill-holding leaves comprises a base C, which in operative position rests on the bottom $e$ against the ledge $f$ and leans against the back $d$ of the case, a button $g$, having a knob $h$, securing the base removably to the back. The frame comprises also two ends D and D', that are attached to the base, there being studs attached to the ends that serve as hinge pins or pivots for the leaves. A pair of relatively long studs E and E' are attached to the ends near the forward part of the frame, and the ends of the studs are supported by a pair of standards F and F', each one of which has a hole $i$ in the base thereof, through which a screw is inserted into the base C, adjustably holding the standard, the upright parts of the standards having each a socket $k$ therein to receive the end of a stud. The screws $j$ may be loosened, so that the standards may swing away from the studs. A suitable number of additional relatively short studs G and G' are also attached to the ends D and D', and grooves $l$ are formed in the base C at suitable distances from the ends.

The bill-holding leaves, as H or H', are hinged to the studs of the frame above mentioned by novel means comprising hinge parts formed of wire, there being at each one of two corners of each leaf a wire coil I, encircling a pivotal stud, each coil having a terminal end part $m$, extending along an end of the leaf and secured thereto by a lip $n$ of the leaf, the coil having also another terminal end part $p$, extending along a side of the leaf and secured thereto by a lip $n'$ of the leaf, so that each hinge part has two branches extending in different directions and with the lips stiffening the corners of the leaves, while being securely attached thereto.

The forward leaf H is subject to relatively severe service and is designed to assist in lifting the remaining leaves to upright positions, and it therefore is provided with relatively long springs J, which encircle the studs E and E', each spring having an arm $q$ bearing on the base C and an arm $r$ engaging the front of the leaf under strain, so as to normally hold the leaf in upright position. The other leaves, as H', are provided each with a pair of springs comprising each a coil J', relatively shorter than the coils J and having each an arm $q$ seated in a groove $l$ and an arm $r$ pressing against the front of the leaf. All of the arms $r$ of the springs have each a lug $s$ extending into a suitable depression in the leaf or into a rubbing-strip $t$ of the leaf.

In order to screen the bills that may be placed on the leaves H or H' and also to partially exclude dust, the free end of each leaf has a guard $u$ attached thereto, that extends rearwardly to the adjacent leaf, and a finger-hold $v$ is also attached to the end of the leaf.

The bill-holding frame is provided with a bunching-yoke $w$ for holding the leaves together when removed from the cabinet.

The leaves, as H and H', are all provided with a suitable number of clips K of improved construction and formed of spring-wire, a single piece of wire for each clip having coils $x$ and $y$ separated one from the other, with ends extending through holes 11 and 12 in the leaf and having hooks 13 at the extremities of the wire. Each clip has a clasp L attached to the middle portions thereof, which stiffens the clip and serves as a plate on which index characters 14 are placed, the free end of the clip having a bar 15 connecting the two side bars that have the clasp attached thereto, the end bar 15 being considerably longer than the clasp. The broad clip ends hold the bills closely against the leaf and prevent the curling up of the edges of the bills.

In practical use the leaves may be moved in the usual manner, and when desired the hinge-springs may be readily removed and replaced by new springs. When the leaves become heavy with accumulated bills and do not rise promptly from horizontal positions, the stronger springs J will cause the front leaf to assist the others in rising to the upright positions.

Having thus described the invention, what is claimed as new is—

1. Credit-accounting appliances including a frame, studs attached to the frame, bill-holding leaves provided with hinge members formed of wire encircling the studs and having ends secured to the leaves, and springs on the studs and engaging the leaves.

2. Credit-accounting appliances including a frame, a plurality of studs attached to the frame, one pair of the studs being longer than the others, bill-holding leaves hinged on the frame, and springs mounted on the studs and engaging the leaves, the springs on said longer studs being longer than the other springs.

3. Credit-accounting appliances including a frame, a plurality of studs attached to the frame, one pair of the studs being longer than the others and having each an end support connected detachably thereto, bill-holding leaves hinged on the studs, and springs mounted on the studs and engaging the leaves, the springs on said longer studs being longer than the other springs.

4. Credit-accounting appliances including a frame, studs attached to the frame, and bill-holding leaves having turned-over edges and provided with hinge members formed of wire encircling the studs and having ends secured in the turned-over edges of the leaves, one end of each hinge member extending parallel to the studs and another end of the hinge member extending at right angles to the studs.

5. Credit-accounting appliances including a frame, studs attached to the frame, bill-holding leaves provided with hinge members formed of wire encircling the studs and having ends secured to the leaves, said leaves being provided also with springs having arms secured against lateral movement to the leaves, the springs being mounted on the studs.

In testimony whereof I affix my signature, in presence of two witnesses, March 26, 1906.

ROLLIN D. PARDEE.

Witnesses:
J. J. BROWN,
W. K. SHECKLER.